Nov. 14, 1944.   R. H. BEACH   2,362,461
HEDGE CUTTER
Filed March 23, 1943
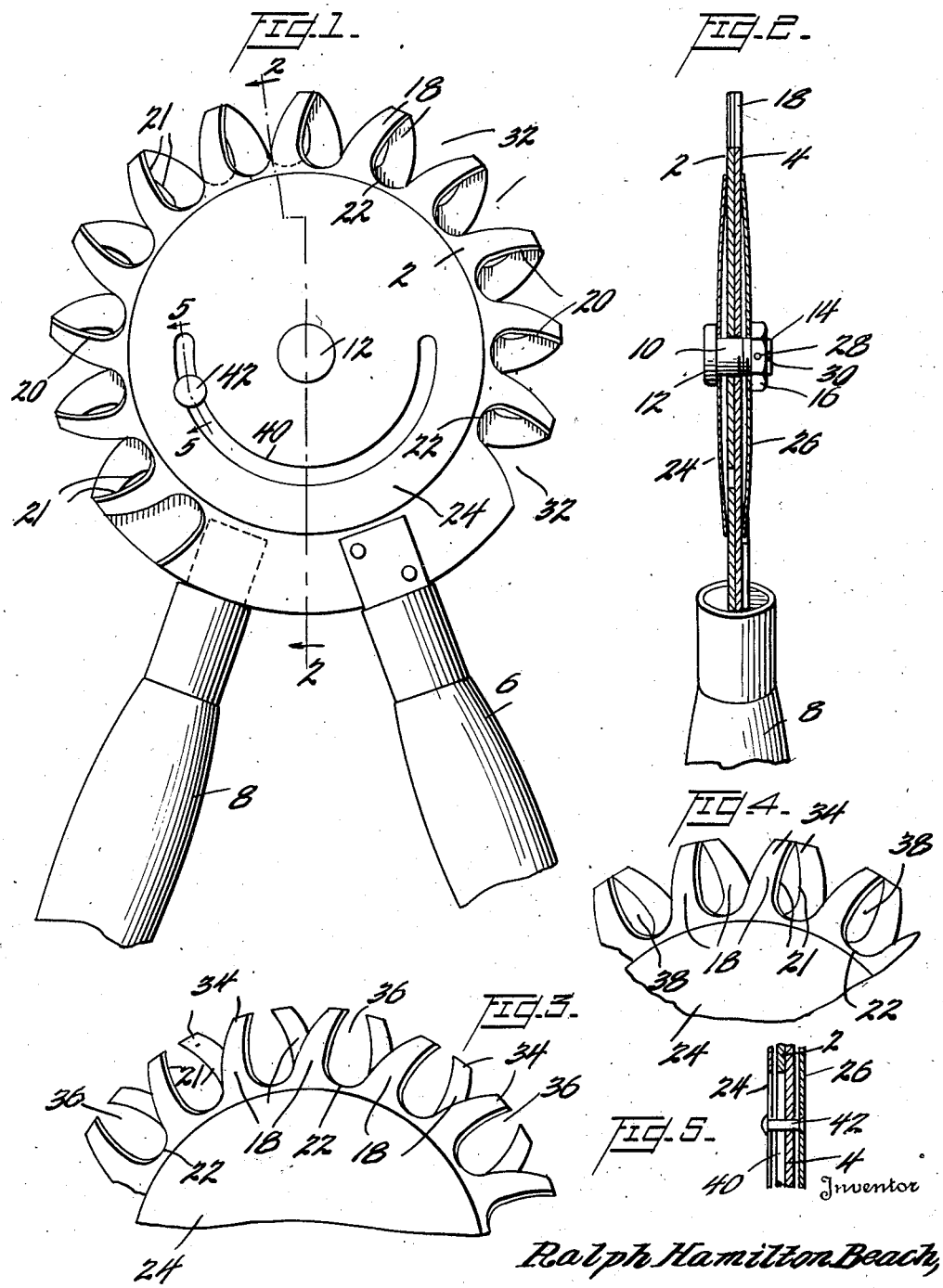
Inventor
Ralph Hamilton Beach,
By Chas. Silver
Attorney Patented Nov. 14, 1944

2,362,461

UNITED STATES PATENT OFFICE 2,362,461

HEDGE CUTTER

Ralph Hamilton Beach, Rockdale, Md.

Application March 23, 1943, Serial No. 480,233

8 Claims. (Cl. 30—214)

This invention relates to cutters and has particular reference to improvements in easily operated hedge cutters.

Among the objects of this invention is the provision of a cutter having a plurality of shears whereby the things to be cut are positively and securely embraced in double-talon grip during shearing.

More specifically, it is an object of this invention to provide a cutter which can readily be hand-operated by an individual to trim hedges of large stalks and twigs of substantial growth, as well as those of smaller size and younger growth, without requiring undue exertion by the operator.

A further object of this invention is to provide a hedge cutter which can be used to cut hedges along patterns or configurations of unlimited variation in design, thereby affording means for wide latitude in production of landscape effects.

A further object of this invention is to provide a hedge cutter which delivers the cuttings toward the operator and away from the hedge and thus leave the standing trimmed hedge substantially free from the cutting.

A still further object of my invention is the provision of a hedge cutter having teeth of special configuration which maintain good and efficient cutting edges for extraordinary periods of use whereby the need for sharpening the teeth is greatly reduced.

Other, further and more specific objects of this invention will become readily apparent to persons skilled in the art from a consideration of the following description when taken in conjunction with the accompanying drawing wherein:

Fig. 1 is a fragmental plan view of my cutter, illustrating a specific embodiment of my invention, portions of the handles thereof being broken away.

Fig. 2 is a fragmental section of my cutter along line 2—2 of Fig. 1.

Figs. 3 and 4 are fragmental views of the cutting discs of my device and show the relative positions of the circumferential or peripheral teeth in the opposing discs in two different stages, as the opposing discs are moved relative to each other.

Fig. 5 is a fragmentary cross-section taken on line 5—5 of Fig. 1.

In the illustration, the specific embodiment of my invention is shown as a hedge cutter which is provided with a pair of centrally-bored, juxtaposed, flat discs 2 and 4 secured to their respective handles 6 and 8. The discs 2 and 4 are held together by a bolt 10 provided with a head 12 and the threaded end 14 which engages the tightening nut 16. The bolt 10 serves as an axle or shaft about which the discs 2 and 4 turn.

Each of the discs 2 and 4 are provided with circumferential or peripheral teeth 18, preferably equidistant from the axis of turning of the discs. These teeth are disposed over the greater portion of the peripheries of these discs. The cutting edges 20 of the teeth 18 are blunt with a small rake, instead of sharply acute as in prior types of hedge cutters, thus affording greater life and durability, because the device lends itself to sharpening without excessive reduction in material of the teeth members.

The cutting edges 21 of the teeth 18 are nonradial with respect to the axis of rotation of the discs 2 and 4 and inclined toward the direction of movement of the discs when cutting, thereby acting like talons. Since the discs 2 and 4 turn in opposite direction, the inclination from the radius of the teeth in one disc is in the opposite direction to that of the teeth in the other disc.

The gullets 22 between the teeth are deep, spacious and wider at the periphery than at the base.

The discs 2 and 4 bear against each other and lubrication is provided between the touching or rubbing faces of these discs. To hold the discs 2 and 4 tightly against each other when in operation while at the same time permitting a yielding action when an obstruction is met, I have provided the concavo-convex disc springs 24 and 26, which bear against the discs 2 and 4, respectively. The peripheries of these concavo-convex discs 24 and 26 are close to the bases of the gullets 22 of the teeth on the discs 2 and 4 and, by extending so far from their axes and bearing against the discs 2 and 4 at such distance from the axes, the slight yielding of the discs 2 and 4 is permitted. These spring discs 24 and 26 are bored to receive the bolt 10 and are disposed so that they can be readily tightened or loosened by the turning of the nut 16 on the threaded end 14 of the bolt. This nut 16 is provided with diametrically opposite perforations 28. The end 14 of the bolt 12 is provided with either slots 30 or suitable perforations to receive a pin which may be passed therethrough and through the perforations of the nut 16 to lock this nut in position. The discs 2 and 4 turn on the bolt 10, which thus serves as an axle, while holding together the discs and disc springs.

When using my device, the handles 6 and 8 are gripped and as they are moved to and fro by the operator, the discs 2 and 4 turn upon each other. The peripheral teeth 18 on these adjacent discs 2 and 4 move toward each other, and the space for accommodating the twigs or branches subjected to shearing undergoes the following changes:

At the maximum peripheral opening of the teeth, as shown in Fig. 1, which constitutes the distance between the teeth, the spaces 32 between the teeth are substantially V-shaped. As the handles 6 and 8 are moved toward each other, the tips 34 of the teeth on opposing members move toward each other and the spaces 36 between the teeth change until slightly more than half of such spaces 36 (see Fig. 3) are closed. At this point, the gullets 22 of the opposite discs 2 and 4 are in registry and the spaces 36 between the teeth are pear-shaped, thus trapping any twigs or branches. On further movement of the handles toward each other, the tips 34 of the teeth continue to move toward each other, the pear-shaped spaces 38 between the teeth grow smaller (see Fig. 4), both at the periphery and at the gullet ends, and progressively decrease until the entire cutting edge of one tooth passes over that of the tooth of the opposing disc in contact therewith, thus clipping or snipping off any twig or branch gripped by the teeth. During this operation, the twig, branch or other object being cut is engaged by the talon-like cutting edges of the teeth on the opposing discs and is positively embraced in double-talon grip.

During this cutting action, the objects undergoing cutting or shearing are forced toward the base of the gullet by the double-talon grip of the cutting edges. These cuttings are thereby delivered toward the operator and away from the hedge, thus leaving standing trimmed hedge substantially free from the cuttings.

It will be seen that my cutter provides a multiplicity of shears so that a large number of twigs, branches or other objects may be handled in a single operation of the cutter.

I have found it advantageous to limit the rotation of the discs. To accomplish this, one of the discs is provided with an arcuate slot 40 which receives the fixed stop 42 projecting from the other disc. This stop 42 may be a headed bolt or pin.

In the illustration shown herein, the spring discs 24 and 26 appear as non-integral with the discs 2 and 4, respectively. However, if desired, these spring discs may be made integral with their respective flat discs.

I have found that my disc construction of hedge cutter affords a large and substantial guiding surface to enable the users to readily cut the hedge in extensive flat top, extensive flat sides and other surfaces of the desired configurations. The user of the hedge cutter has substantially perfect control of the cutting from the standpoint of the finished surfaces of hedge desired.

My novel hedge cutter enables the user to maintain uniform direction of cuttings and the production of the desired configurations of hedge.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a cutter, a pair of juxtaposed contacting discs disposed to turn upon each other and about a common axis, means for producing talon-like shearing effect on objects to be cut, said means comprising a plurality of peripheral cutting teeth on each disc equidistant from the axis of turning, the cutting edge of each of said cutting teeth on one disc being inclined in a direction opposite to the inclination of the cutting edge of each of said cutting teeth on the other disc whereby the objects to be cut are positively embraced in double-talon grip and sheared by said teeth as the spaces between the cutting edges of engaging teeth moving upon each other diminish and vanish, a concavo-convex disc upon the outside of each of said first-named discs extending close to the gullets of the teeth on said first-named discs, a handle on each disc, and means for limiting the turning of the discs upon each other.

2. In a hedge cutter, a pair of flat juxtaposed contacting discs disposed to turn upon each other and about a common axis, means for producing talon-like shearing effect on objects to be cut, said means comprising a plurality of peripheral cutting teeth on each disc equidistant from the axis of turning, the cutting edge of each of said cutting teeth on one disc being inclined in a direction opposite to the inclination of the cutting edge of each of said cutting teeth on the other disc whereby the objects to be cut are positively embraced in double-talon grip and sheared by said teeth as the spaces between the cutting edges of engaging teeth moving upon each other diminish and vanish, a concavo-convex disc upon the outside of each of said flat discs extending close to the gullets of the teeth on said flat discs and a tightening bolt through said flat discs and concavo-convex discs, a handle on each flat disc, and means for limiting the turning of the flat discs upon each other.

3. In a hedge cutter, a pair of flat juxtaposed contacting discs disposed to turn upon each other and about a common axis, means for producing shearing effect on objects to be cut, said means comprising a plurality of peripheral cutting teeth on each disc equidistant from the axis of turning, a concavo-convex disc upon the outside of each of said flat discs extending close to the gullets of the teeth on said flat discs and a tightening bolt through said flat discs and concavo-convex discs, a handle on each flat disc, and means for limiting the turning of the flat discs upon each other.

4. In a cutter, a pair of contacting discs disposed to turn upon each other, a tightening bolt through said discs, means for producing talon-like shearing effect on objects to be cut, said means comprising a plurality of peripheral cutting teeth on each disc, said cutting teeth on one disc being inclined in a direction opposite to the inclination of said cutting teeth on the other disc whereby the objects to be cut are positively embraced in double-talon grip and sheared by said teeth as the spaces between the cutting edges of the engaging teeth moving upon each other diminish and vanish, a spring concavo-convex disc upon the outside of each of said first-named discs extending close to the gullets of the teeth on said first-named discs and having bores for receiving said tightening bolt.

5. In a cutter, a pair of flat juxtaposed contacting discs disposed to turn upon each other and about a common axis, means for producing talon-like shearing effect on objects to be cut, said means comprising a plurality of peripheral cutting teeth on each disc equidistant from the axis of turning, the cutting edge of each of said cutting teeth on one disc being inclined in a direction opposite to the inclination of the cutting edge of each of said cutting teeth on the other disc whereby the objects to be cut are positively embraced in double-talon grip and sheared by said teeth as the spaces between the cutting edges of engaging teeth moving upon each other diminish and vanish, a spring concavo-convex disc upon the outside of each of said flat discs extending close to the gullets of the teeth on said flat discs and a tightening bolt through said flat discs and concavo-convex discs.

6. In a cutter, a pair of juxtaposed contacting discs disposed to turn upon each other and about a common axis and means for producing shearing effect on objects to be cut, said means comprising a plurality of peripheral cutting teeth on each disc equidistant from the axis of turning, a spring disc upon the outside of each of said first-named discs extending close to the gullets of the teeth on said first-named discs, and tightening means for holding said discs in operative position.

7. In a cutter, a pair of juxtaposed contacting discs disposed to turn upon each other and means for producing talon-like shearing effect on objects to be cut, said means comprising a plurality of peripheral cutting teeth on each disc, said cutting teeth being disposed to embrace in talon grip the object to be cut and shear said object as the spaces between the cutting edges of the engaging teeth moving upon each other diminish and vanish, a spring disc upon the outside of at least one of said first-named discs extending close to the gullets of the teeth on said first-named discs, and tightening means for holding said discs in operative position.

8. In a cutter, a pair of juxtaposed contacting discs disposed to turn upon each other and about a common axis and means for producing shearing effect on objects to be cut, said means comprising a plurality of peripheral cutting teeth on each disc equidistant from the axis of turning, a spring disc upon the outside of at least one of said first-named discs extending close to the gullets of the teeth on said first-named discs, and tightening means for holding said discs in operative position.

RALPH HAMILTON BEACH.